(12) United States Patent
Ohmacht et al.

(10) Patent No.: US 8,312,193 B2
(45) Date of Patent: Nov. 13, 2012

(54) EAGER PROTOCOL ON A CACHE PIPELINE DATAFLOW

(75) Inventors: Martin Ohmacht, Yorktown Heights, NY (US); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/684,630

(22) Filed: Jan. 8, 2010

(65) Prior Publication Data

US 2011/0173358 A1    Jul. 14, 2011

(51) Int. Cl.
*G06F 13/372* (2006.01)
(52) U.S. Cl. ........................................ 710/110; 713/502
(58) Field of Classification Search .................. 710/110, 710/316, 317; 713/502
See application file for complete search history.

(56) References Cited

U.S. PATENT DOCUMENTS

| | | | |
|---|---|---|---|
| 4,521,880 A * | 6/1985 | Orsic | 370/376 |
| 4,570,220 A * | 2/1986 | Tetrick et al. | 710/306 |
| 4,656,622 A * | 4/1987 | Lea | 370/353 |
| 4,841,373 A * | 6/1989 | Asami et al. | 358/404 |
| 4,929,939 A * | 5/1990 | Varma et al. | 340/2.24 |
| 5,072,439 A * | 12/1991 | Forrest et al. | 398/78 |
| 5,862,136 A * | 1/1999 | Irwin | 370/395.4 |
| 6,044,414 A * | 3/2000 | Gulick | 710/22 |
| 6,445,624 B1* | 9/2002 | Janzen et al. | 365/191 |
| 7,353,484 B1* | 4/2008 | Pritchard et al. | 716/117 |
| 8,180,990 B2* | 5/2012 | Kitamura | 711/168 |
| 2003/0065844 A1* | 4/2003 | Lester et al. | 710/107 |

* cited by examiner

*Primary Examiner* — Paul R Myers
(74) *Attorney, Agent, or Firm* — Scully, Scott, Murphy & Presser, P.C.; Daniel P. Morris, Esq.

(57) ABSTRACT

A master device sends a request to communicate with a slave device to a switch. The master device waits for a period of cycles the switch takes to decide whether the master device can communicate with the slave device, and the master device sends data associated with the request to communicate at least after the period of cycles has passed since the master device sent the request to communicate to the switch without waiting to receive an acknowledgment from the switch that the master device can communicate with the slave device.

19 Claims, 6 Drawing Sheets

EAGER PROTOCOL ON A CACHE PIPELINE DATAFLOW

STATEMENT REGARDING FEDERALLY SPONSORED RESEARCH OR DEVELOPMENT

This invention was made with Government support under Contract No.: B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, for "USING DMA FOR COPYING PERFORMANCE COUNTER DATA TO MEMORY"; U.S. patent application Ser. No. 12/684,172 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. patent application Ser. No. 12/684,496, for "HARDWARE SUPPORT FOR SOFTWARE CONTROLLED FAST RECONFIGURATION OF PERFORMANCE COUNTERS"; U.S. patent application Ser. No. 12/684,429, for "HARDWARE SUPPORT FOR SOFTWARE CONTROLLED FAST MULTIPLEXING OF PERFORMANCE COUNTERS"; U.S. patent application Ser. No. 12/697,799, for "DISTRIBUTED PERFORMANCE COUNTERS"; U.S. patent application Ser. No. 12/684,738, for "LOCAL ROLLBACK FOR FAULT-TOLERANCE IN PARALLEL COMPUTING SYSTEMS"; U.S. patent application Ser. No. 12/696,780, for "LOCAL ROLLBACK FOR FAULT-TOLERANCE IN PARALLEL COMPUTING SYSTEMS"; U.S. patent application Ser. No. 12/684,860, for "PROCESSOR WAKE ON PIN"; U.S. patent application Ser. No. 12/684,174, for "PRECAST THERMAL INTERFACE ADHESIVE FOR EASY AND REPEATED, SEPARATION AND REMATING"; U.S. patent application Ser. No. 12/684,184, for "ZONE ROUTING IN A TORUS NETWORK"; U.S. patent application Ser. No. 12/684,852, for "PROCESSOR WAKEUP UNIT"; U.S. patent application Ser. No. 12/684,642, for "TLB EXCLUSION RANGE"; U.S. patent application Ser. No. 12/684,804, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 12/986,349, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, for "SUPPORT FOR NON-LOCKING PARALLEL RECEPTION OF PACKETS BELONGING TO THE SAME MESSAGE"; U.S. patent application Ser. No. 12/688,773 (YOR920090560US1 (24714)), for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE DIRECTORY LOOK-UP REUSE"; U.S. patent application Ser. No. 13/008,502, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 12/696,825, for "LIST BASED PREFETCH"; U.S. patent application Ser. No. 12/684,693, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. patent application Ser. No. 12/731,796, for "NETWORK SUPPORT FOR SYSTEM INITIATED CHECKPOINTS"; U.S. patent application Ser. No. 12/696,746, for "TWO DIFFERENT PREFETCH COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 12/727,967, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287 for ARBITRATION IN CROSSBAR FOR LOW LATENCY; U.S. patent application Ser. No. 12/723,277 for EMBEDDED GLOBAL BARRIER AND COLLECTIVE IN A TORUS NETWORK; U.S. patent application Ser. No. 12/696,764 for GLOBAL SYNCHRONIZATION OF PARALLEL PROCESSORS USING CLOCK PULSE WIDTH MODULATION; U.S. patent application Ser. No. 12/796,411 for IMPLEMENTATION OF MSYNC; U.S. patent application Ser. No. 12/796,389 for NON-STANDARD FLAVORS OF MSYNC; U.S. patent application Serial No. 12/696,817 for HEAP/STACK GUARD PAGES USING A WAKEUP UNIT; U.S. patent application Ser. No. 12/697,164 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475 for REPRODUCIBILITY IN BGQ.

FIELD

The present disclosure generally relates to computer architecture, and more particularly to communication protocol on a microprocessor pipeline dataflow.

BACKGROUND

An integrated circuit (IC) or chip may include multiple cores or processors and memory devices and a switch that arbitrates the communication among the devices. For instance, a cross bar switch connects the devices and arbitrates available slots for communicating among the devices. Typically, switch components and devices on the IC are not placed near enough to be able to communicate in one clock cycle. Thus, communications among the devices are split into latch stages and usually it takes multiple cycles to pass information back and forth among the devices.

BRIEF SUMMARY

A method of scheduling communications between a plurality of master devices and a plurality of slave devices, in one aspect, may include a master device sending a request to communicate with a slave device to a switch. The method may also include the master device waiting for a period of cycles the switch takes to decide whether the master device can communicate with the slave device. The method may further include the master device sending data associated with the request to communicate at least after the period of cycles has passed since the master device sent the request to communicate to the switch without waiting to receive an acknowledgment from the switch that the master device can communicate with the slave device.

A system for scheduling communications between a plurality of master devices and a plurality of slave devices, in one aspect, may include a plurality of master devices on an integrated circuit, a plurality of slave device integrated on the integrated circuit, and a switch integrated on the integrated circuit and operable to arbitrate communications between the plurality of master devices and the plurality of slave devices. The plurality of master devices may be operable to send a request to communicate with one or more of the plurality of slave devices to the switch, and the plurality of master devices may be further operable to send data at least after a predetermined number of cycles has passed after sending the request to communicate without waiting to receive an acknowledgment from the switch that the data can be sent.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method and system are described that reduce latency between masters (e.g., processors) and slaves (e.g., devices having memory/cache-L2 slices) communicating with one another through a central cross bar switch.

Figure 1:
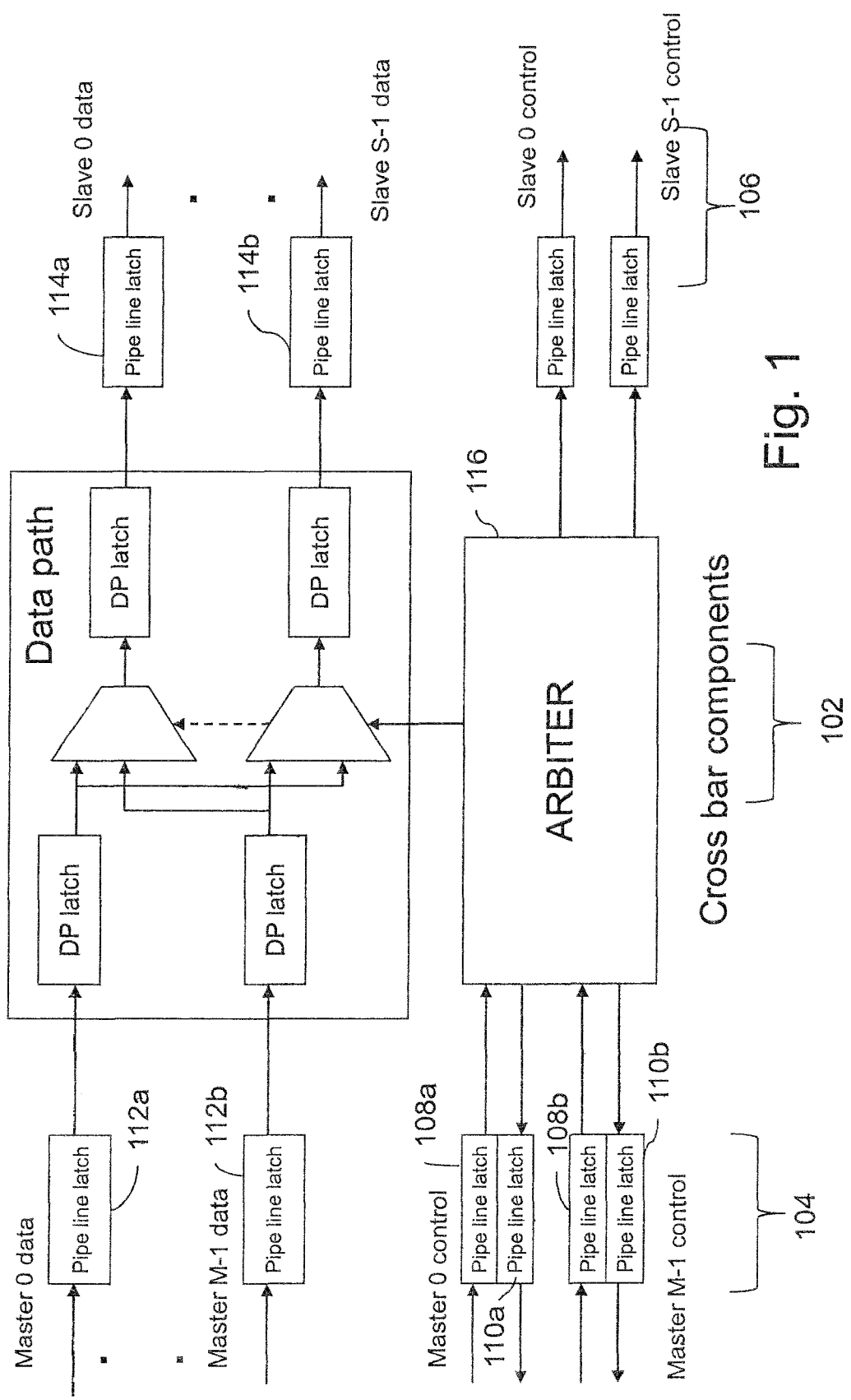
FIG. 1 is a diagram illustrating communications between masters and slaves via a cross bar switch.

FIG. 1 is a diagram illustrating communications between masters and slaves via a cross bar switch. In a multiprocessor system on a chip (e.g., in integrated circuit such as an application specific integrated circuit (ASIC)), "M" processors (e.g., 0 to M−1) are connected to a centralized crossbar switch 102 through one or more pipe line latch stages 104. Similarly, "S" slave devices, for example, cache slices (e.g., 0 to S−1) are also connected to the crossbar switch through one or more pipeline stages 106.

Any master "m" desiring to communicate with a slave "s" goes through the following steps:
1) Sends a request (e.g., "req_r1") to the crossbar indicating its need to communicate with the slave "s", for example, via a pipe line latch 108a;
2) The cross bar 102 receives requests from a plurality of masters, for example, all the M masters. If more than one master wants to communicate with the same slave, the cross bar 102 arbitrates among the multiple requests competing for the same slave "s";
3) Once the cross bar 102 has determined that a slot is available for transferring the information from "m" to "s", it sends a "schedule" command (e.g., "sked_r1" to the master "m"), for example, via a pipe line latch 110a;
4) The master "m" now sends the information (say "info_r1") associated with the request (for example, if it wants to store, then store address and data) to the crossbar switch, for example, via a pipe line latch 112a;
5) The cross bar switch now sends this information ("info_r1") to the slave "s", for example, via a pipe line latch 114a.

Figure 5:
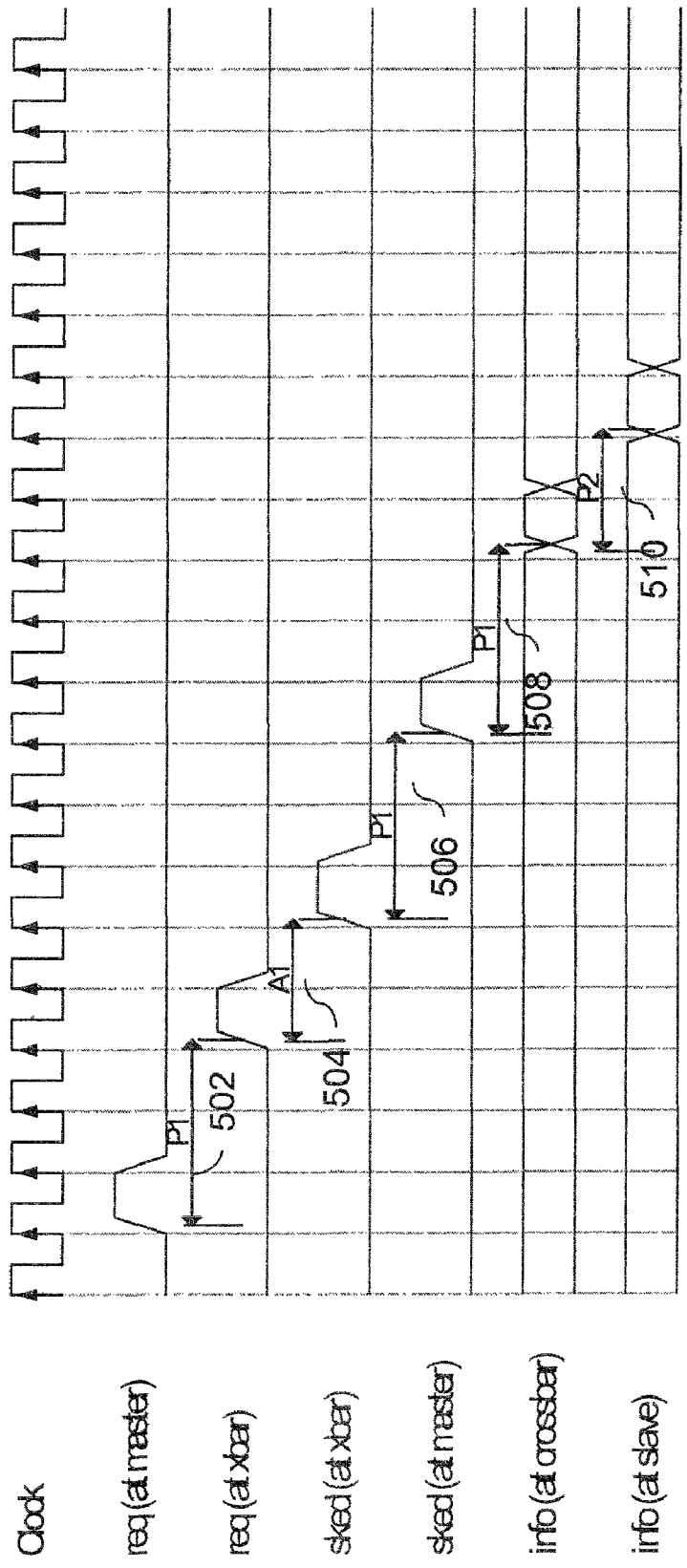
FIG. 5 shows an example of cycle time taken for communicating between a master and a slave.

The latency expected for communicating among the masters, the cross bar 102, and the slaves are shown in FIG. 5. Let us assume that there are p1 pipeline stages between a master and the crossbar switch and p2 pipeline stages between the crossbar switch and a slave. Following is a typical latency calculation for a request assuming that there is no contention for the slave. A master sending a request ("req_r1") to the cross bar may take p1 cycles, for example, as shown at 502. Crossbar arbitrating multiples requests from multiple masters may take A1 cycles, for example, as shown at 504. Cross bar sending a schedule command (e.g., "sked_r1") may take p1 cycles, for example, as shown at 506. Master sending the information to the crossbar (e.g., "info_r1") may take p1 cycles, for example, as shown at 508. Crossbar sending the information (e.g., "info_r1") to the slave may take p2 cycles, for example, as shown at 510. The number of cycles spent in sending information from a master to a slave totals to 3*(p1)+A+p2 cycles in this example.

Referring back to FIG. 1, the method and system in one embodiment of the present disclosure reduce the latency or number of cycles it takes in communicating between a master and a slave. In one aspect, this is accomplished without buffering information, for example, to keep the area or needed resources such as buffering devices to a minimum. A master, for example, master "m" sends a request ("req_r1") to the cross bar 102 indicating its intention to communicate with slave "s", for example, via a pipe line latch 108b. The master "eagerly" sends the information (e.g., "info_r1") to be transferred to the slave "A" cycles after sending the request, for example, via pipe line latch 112b unless there is information to be sent in response to a "schedule" command. The master continues to drive the information to be transferred to the slave unless there is a "schedule" command or "A" or more cycles have elapsed after a later request (e.g., "req_r2") has been issued.

The cross bar switch 102 arbitrates among the multiple requests competing for the same slave "s". In one embodiment, the cross bar switch 102 may include an arbiter logic 116, which makes decisions as to which master can talk to which slave. The cross bar switch 102 may include an arbiter for each master and each slave slice, for instance, a slave arbitration slice for each slave 0 to S−1, and a master arbitration slice for each master 0 to M−1. Once it has determined that a slot is available for transferring the information from "m" to "s", the crossbar 102 sends the information ("info_r1") to the slave "s", for example, via a pipe line latch 114b. The crossbar 102 also sends an acknowledgement back to the master "m" that the "eager" scheduling has succeeded, for example, via a pipe line latch 110b.

Figure 6:
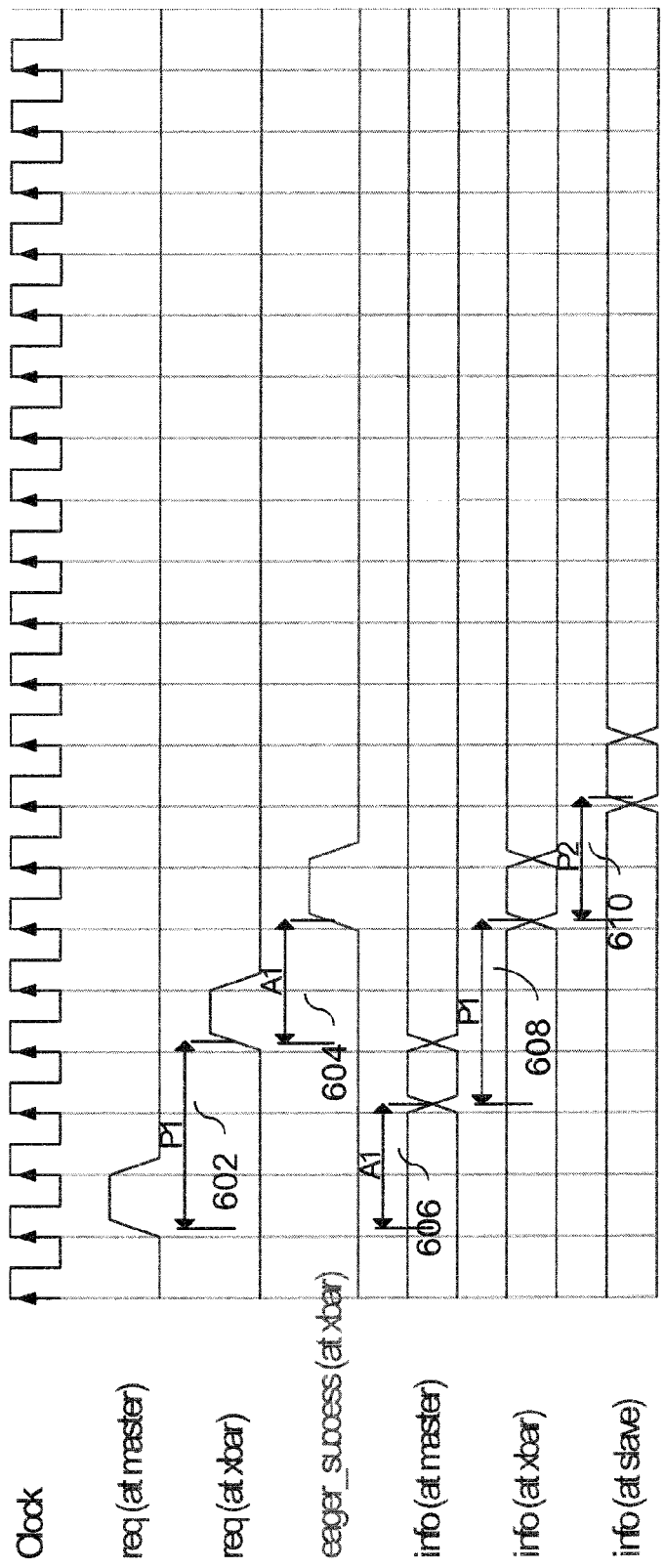
FIG. 6 shows an example of cycle time spent for communicating between a master and a slave using eager scheduling.

Eager scheduling latency is shown in FIG. 6 which illustrates the cycles incurred in communicating between a master and a slave with the above-described eager scheduling protocol. A master sending a request ("req_r1") to the cross bar may take p1 cycles as shown at 602. Arbitration by the crossbar may take A cycles, for example, as shown at 604. The crossbar sending the information ("info_r1") to the slave may take p2 cycles. Thus, it takes a total of 1*(p1)+A+p2 cycles to send information or data from a master to a slave. Compared with the non-eager scheduling shown in FIG. 5, eager scheduling has reduced the latency by 2*p1 cycles. Eager scheduling protocol sends the information only after waiting the number of cycles the crossbar takes to arbitrate, for example, shown at 606. Thus, the cycle time taken for sending the information (e.g., shown at 606 and 608) overlaps with the time the spent in transferring the request and the time spent by the crossbar in arbitrating (e.g., shown at 602 and 604).

Figure 2:
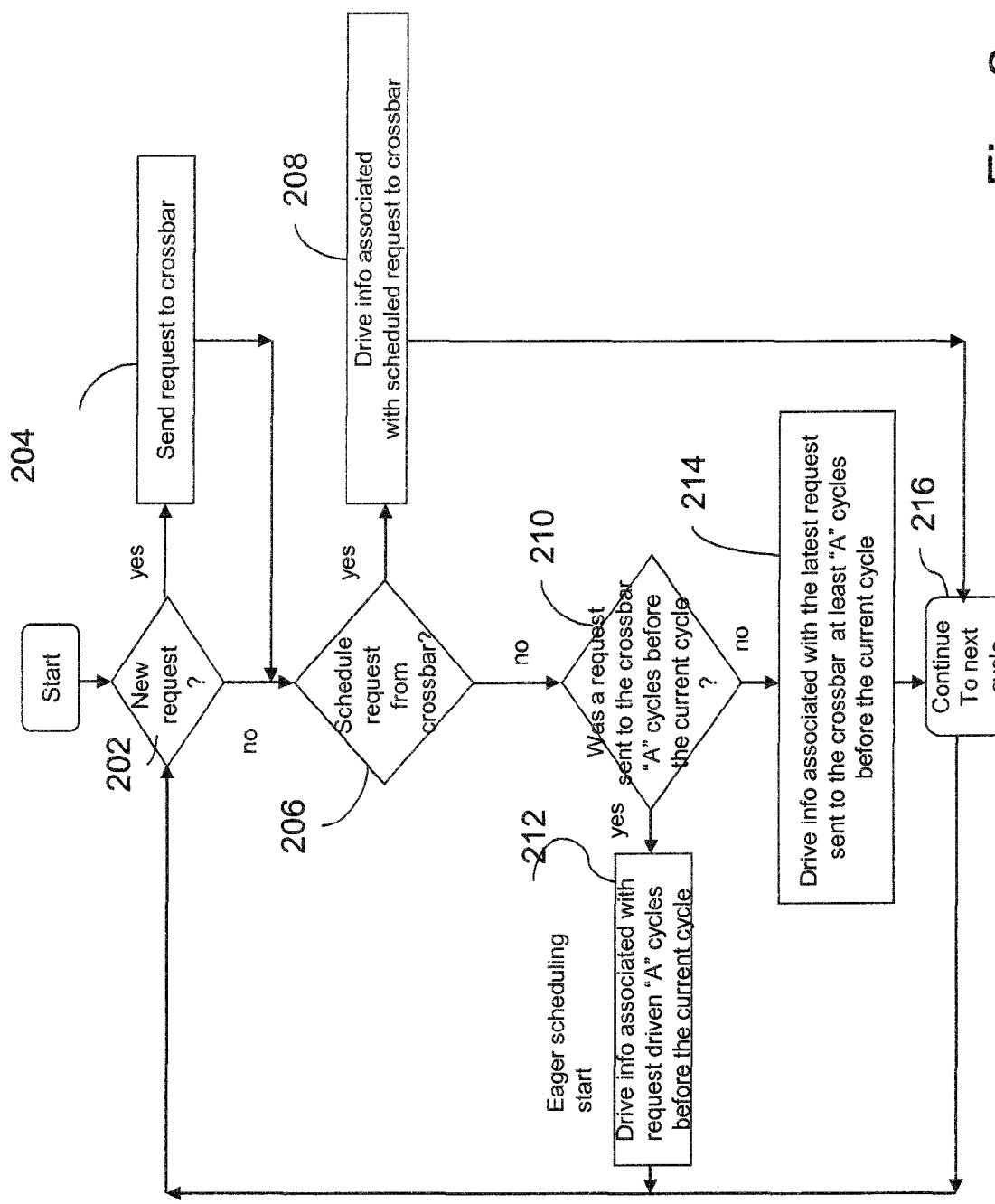
FIG. 2 is a flow diagram illustrating a cross bar functionality in one embodiment of the present disclosure.

FIG. 2 is a flow diagram illustrating a core or processor to crossbar scheduling in one embodiment of the present disclosure. At 202, a master device, for example, a processor or a core, determines whether there is a new request to send to the cross bar switch. If there is no new request, the logic flow continues at 206. If there is a new request, then at 204, request is sent to the cross bar switch. The logic flow then continues to 206.

At 206, the master device checks whether a request to schedule information has been received from the cross bar switch. If there is no request to schedule information, the logic flows to 210. If a request to schedule the information has been received, the master sends the information associated with this request to schedule to the cross bar switch at 208. The logic flow then continues to 210.

At 210, it is determined whether a request was sent to the crossbar "arbitration delay" cycles before the current cycle. If so, at 212, the master device "eagerly" sends the information or data associated with the request that was sent "arbitration delay" cycles before the current cycle. The logic then continues to 202 where it is again determined whether there is a new request to send information to the cross bar switch.

At 214, if no request was sent to the crossbar "arbitration delay" cycles before the current cycle, then the master device drives or sends to the cross bar switch the information associated with the latest request that was sent at least "arbitration cycles" before the current cycle. At 216, the master device proceeds to the next cycle and the logic returns to continue at 202.

The master continues to drive the information associated with the latest request sent at least "A" cycles before. So as long as no new requests are sent to the switch by that master, eager scheduling success is possible even in later cycles than the one indicated in FIG. 6.

As an implementation example, each of the slave arbitration slices may maintain M counters (counter 0 to counter M−1). Counter[m][s] signals the number of pending requests from master "m" to slave "s". When a master "m" sends a request to a slave "s", counter[m][s] is incremented by that slave. When a request to that master gets scheduled (eager or non eager), the counter gets decremented. Each of the master arbitration slices also maintains the identifier of the slave that is last sent by the master. When a request to a master "m" gets scheduled to slave s, the identifier of the slave that is last sent by that master is matched with "s". If there is a match, then eager scheduling is possible. Other implementations are possible to perform the eager scheduling described herein, and the present invention is not limited to one specific implementation.

Figure 3:
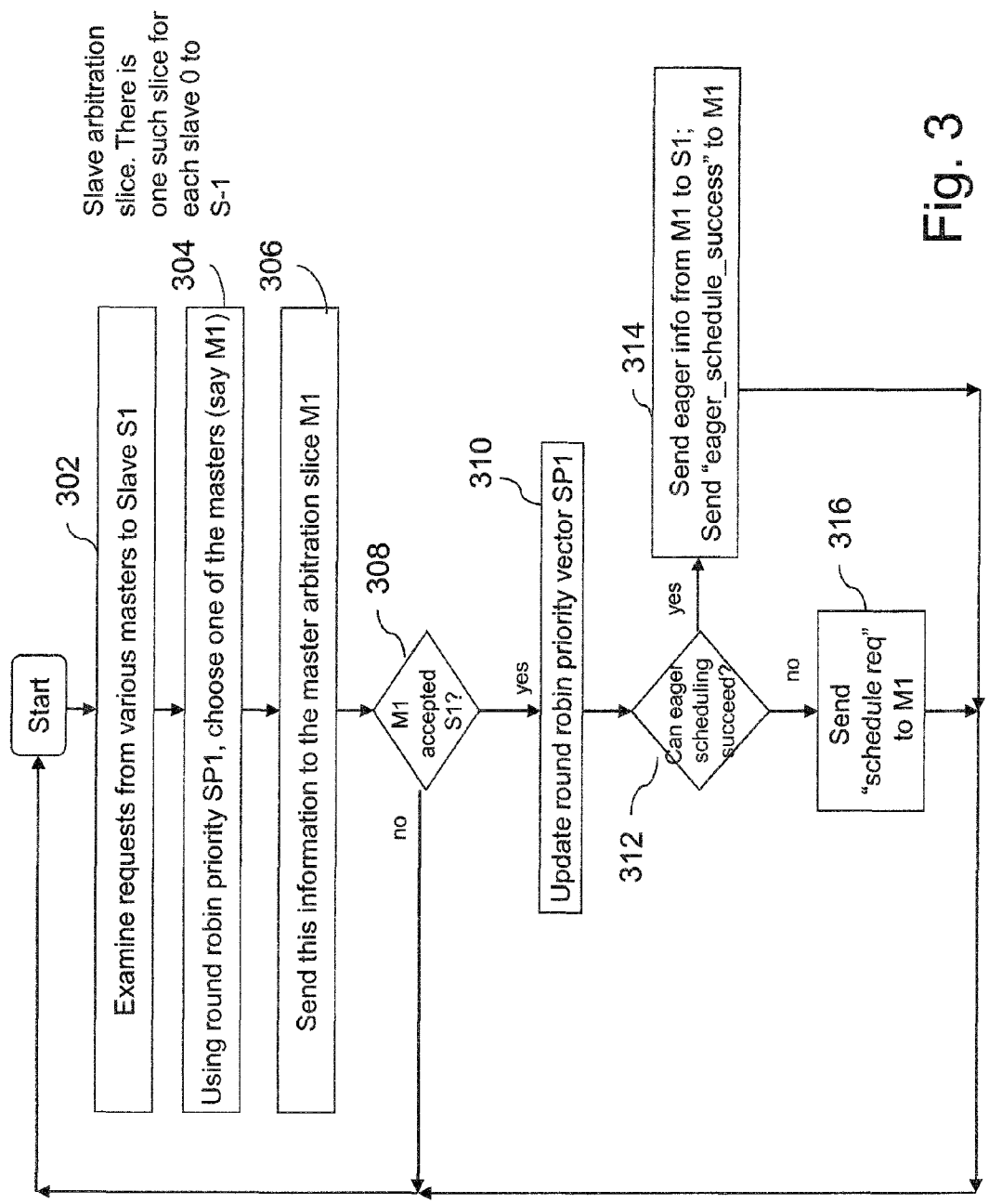
FIG. 3 illustrates functions of an arbitration slice for a slave device in one embodiment of the present disclosure.

FIG. 3 is a flow diagram illustrating functionality of the cross bar switch in one embodiment of the present disclosure. A cross bar switch may include an arbiter logic, e.g., shown in FIG. 1 at 116, which makes decisions as to which master can talk to which slave. The cross bar switch may include an arbiter which performs distributed arbitration. For instance, there may be arbitration logic for each slave, for instance, a slave arbitration slice for each slave 0 to S−1. Similarly, there may be arbitration logic for each master, for instance, a master arbitration slice for each master 0 to M−1. FIG. 3 illustrates functions of an arbitration slice for one slave device, for example, slave s1.

At 302, an arbiter, for example, a slave arbitration slice for s1 examines one or more requests from one or more masters to slave s1. At 304, a master is selected. For instance, if there is more than one master desiring to talk to slave s1, the slave arbitration slice for s1 may use a predetermined protocol or rule to select one master. If there is only one master requesting to talk to this slave device, arbitrating for a master is not needed. Rather, that one master is selected. The predetermined protocol or rule may to use round robin priority selection method. Other protocols or rules may be employed for selecting a master from a plurality of masters.

At 306, the slave arbitration slice sends the information that it selected a master, for example, master m1 to the master arbitration slice responsible for master m1. At 308, it is determined whether the selected master accepted the slave arbitration slice's decision. It may be that this master has received selections or other requests to talk from more than one slave. In such cases the master may not accept the slave arbitration slice's decision to talk to it. If the selected master does not accept, for example, for that reason or other reasons, the logic flow returns to 302 where the slave arbitration slice examines more requests.

At 308, if the selected master has accepted the slave arbitration slice's decision to talk to it, then the priority vector of may be updated to indicate that this master has been selected, for example, so that in the next selection process, this master does not get the highest priority of selection and another master may be selected.

Once the slot between the selected master and this slave has been made available or established for example according to the previous steps for communication, it is determined at 310 whether the eager scheduling can succeed. That is, the slave arbitration slice determines whether the information or data is available from this master that it can send to the slave device. The information or data may be available at the cross bar switch, if the selected master has sent the information "eagerly" after waiting for an arbitration delay period even without an acknowledgment from the cross bar switch to send the information.

If at 312, it is determined that the information can be sent to the slave, the information from the selected master is sent to the slave at 314. The arbitration slice sends a notification to the master arbitration slice that the eager scheduling succeeded. The master arbitration slice then sends the eager scheduling success notice to the selected master. The logic returns to 302 to continue to the next request.

If at 312, it is determined that the information is not available to send to the slave currently, slave arbitration slice sends a notification or request to schedule the information or data to the master at 316, for example, via the master's arbitration slice at the cross bar switch. The logic returns to 302 to continue to the next request.

Figure 4:
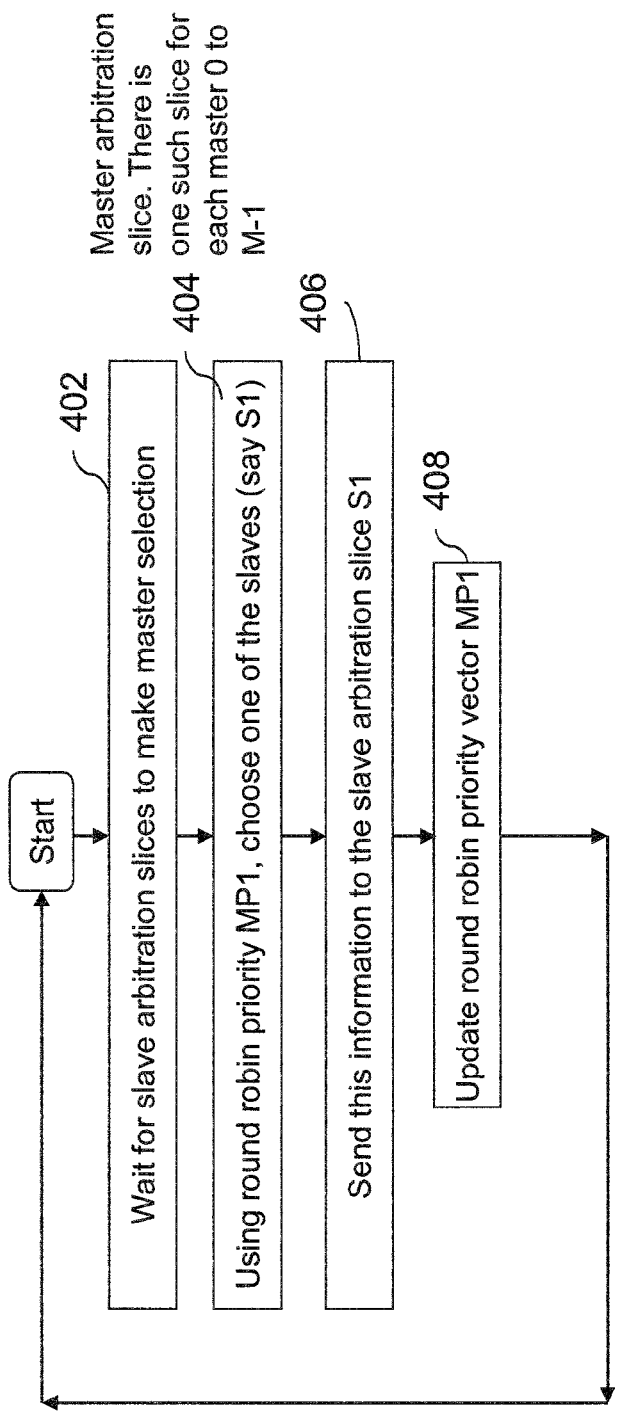
FIG. 4 illustrates functions of an arbitration slice for a master device in one embodiment of the present disclosure.

FIG. 4 illustrates functions of an arbitration slice for one master device in one embodiment of the present disclosure. As explained above, the cross bar switch may include an arbitration slice for each master device, for example, master 0 to master M−1 on an integrated chip. At 402, an arbitration slice for a master device waits for slave arbitration slices to select a master. At 404, the arbitration slice may use a predetermine protocol or rule such as a round robin selection protocol or others to select a slave among the slaves that have selected this master to communicate with. If only one slave has selected this master currently, the master arbitration slice need not arbitrate for a slave, rather the master arbitration slice may accept that slave.

At 406, the master arbitration slice notifies the slave selected for communication. This establishes the communication or slot between the master and the slave. At 408, a priority vector or the like may be updated to indicate that this slave has been selected, for example, so that this slave does not get the highest priority for selection in the next round of selections. Rather, other slaves a given a chance to communicate with this master in the next round.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of scheduling communications between a plurality of master devices and a plurality of slave devices, comprising:
    a master device sending a request to communicate with a slave device to a switch;
    the master device waiting for a period of cycles the switch takes to decide whether the master device can communicate with the slave device; and
    the master device sending data associated with the request to communicate at least after the period of cycles has passed since the master device sent the request to communicate to the switch without waiting to receive an acknowledgment from the switch that the master device can communicate with the slave device.

2. The method of claim 1, wherein the switch is a cross bar switch.

3. The method of claim 1, wherein the master devices is one master device among a plurality of master devices on an integrated chip.

4. The method of claim 1, wherein the slave device is one slave device among a plurality of slave devices on an integrated chip.

5. The method of claim 1, wherein the switch is a central switch via which the master device communicates to the slave device.

6. The method of claim 1, wherein the master device includes a processor core.

7. The method of claim 1, wherein the slave device includes a memory device.

8. A system for scheduling communications between a plurality of master devices and a plurality of slave devices, comprising:
    a plurality of master devices on an integrated circuit;
    a plurality of slave device integrated on the integrated circuit;
    a switch integrated on the integrated circuit and operable to arbitrate communications between the plurality of master devices and the plurality of slave devices;
    the plurality of master devices operable to send a request to communicate with one or more of the plurality of slave devices to the switch, and the plurality of master devices further operable to send data at least after a predetermined number of cycles has passed after sending the request to communicate without waiting to receive an acknowledgment from the switch that the data can be sent.

9. The system of claim 8, wherein the switch is a cross bar switch.

10. The system of claim 8, wherein the switch is a central switch via which the plurality of master devices communicates with the plurality of slave devices.

11. The system of claim 8, wherein one or more of the plurality of master devices includes a processor core.

12. The system of claim 8, wherein one or more of the plurality of slave devices includes a memory device.

13. A computer readable storage medium storing a program of instructions executable by a machine to perform a method of scheduling communications between a plurality of master devices and a plurality of slave devices, comprising:
   a master device sending a request to communicate with a slave device to a switch;
   the master device waiting for a period of cycles the switch takes to decide whether the master device can communicate with the slave device; and
   the master device sending data associated with the request to communicate at least after the period of cycles has passed since the master device sent the request to communicate to the switch without waiting to receive an acknowledgment from the switch that the master device can communicate with the slave device.

14. The computer readable storage medium of claim 13, wherein the switch is a cross bar switch.

15. The computer readable storage medium of claim 13, wherein the master devices is one master device among a plurality of master devices on an integrated chip.

16. The computer readable storage medium of claim 13, wherein the slave device is one slave device among a plurality of slave devices on an integrated chip.

17. The computer readable storage medium of claim 13, wherein the switch is a central switch via which the master device communicates to the slave device.

18. The computer readable storage medium of claim 13, wherein the master device includes a processor core.

19. The computer readable storage medium of claim 13, wherein the slave device includes a memory device.

* * * * *